(12) United States Patent
Han et al.

(10) Patent No.: US 11,561,404 B2
(45) Date of Patent: Jan. 24, 2023

(54) MOUNT DEVICE TO WHICH AN EXTERNAL ELECTRONIC DEVICE CAN BE COUPLED SO AS TO SLOPE

(71) Applicant: SAMSUNG ELECTRONICS CO., LTD., Suwon-si (KR)

(72) Inventors: Kiwook Han, Suwon-si (KR); Taehyoung Kim, Suwon-si (KR); Minhyuk Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 16/955,478

(22) PCT Filed: Dec. 12, 2018

(86) PCT No.: PCT/KR2018/015750
§ 371 (c)(1),
(2) Date: Jun. 18, 2020

(87) PCT Pub. No.: WO2019/124864
PCT Pub. Date: Jun. 27, 2019

(65) Prior Publication Data
US 2020/0319470 A1    Oct. 8, 2020

(30) Foreign Application Priority Data

Dec. 19, 2017    (KR) .................. 10-2017-0175045

(51) Int. Cl.
*G02B 27/01*    (2006.01)
*G02B 17/04*    (2006.01)

(52) U.S. Cl.
CPC ......... *G02B 27/0176* (2013.01); *G02B 17/04* (2013.01); *G02B 27/0172* (2013.01); *G02B 2027/0169* (2013.01)

(58) Field of Classification Search
CPC .............. G02B 27/017; G02B 27/0172; G02B 27/0176; G02B 17/04; G02B 2027/0169; G02B 30/56
See application file for complete search history.

(56) References Cited

U.S. PATENT DOCUMENTS 8,908,279 B2    12/2014    Omura et al.
10,886,761 B1*  1/2021    Schobben ............ A61N 1/3787
(Continued)

FOREIGN PATENT DOCUMENTS

| KR | 10-2002-0066889 | 8/2002 |
| KR | 10-0377359 | 3/2003 |
| WO | 2016/103525 | 6/2016 |

OTHER PUBLICATIONS

International Search Report for PCT/KR2018/015750 dated Mar. 25, 2019, 5 pages.
(Continued)

*Primary Examiner* — Alexander Eisen
*Assistant Examiner* — Cory A Almeida
(74) *Attorney, Agent, or Firm* — Nixon & Vanderhye, P.C.

(57) ABSTRACT

Disclosed are various embodiments regarding a head-mounted device. According to an embodiment, a mount device comprises: a housing comprising a front surface, a rear surface that can be mounted on a head, and a side surface surrounding the front surface and the rear surface; a coupling portion can be disposed in housing, and can be configured to be coupled so as to slope an external electronic device at a designated angle with regard to the side surface; a prism comprising a first surface capable of facing, at the designated angle, at least a part of a display included in the external electronic device that can be coupled to the coupling portion, a second surface capable of changing (through total reflection) the direction of light that is incident from the (Continued)

display through the first surface, and a third surface capable of emitting the light, the direction of which has changed; a mirror arranged between at least a part of the side surface and the third surface; and a splitter arranged between the mirror and the third surface to be capable of transmitting at least a part of light emitted through the third surface and changing the direction of the light, which is transmitted and then reflected by the mirror, to a direction corresponding to the rear surface. Various other embodiments are possible.

12 Claims, 7 Drawing Sheets

(56) References Cited

U.S. PATENT DOCUMENTS

2002/0109993 A1* 8/2002 Jung .................. G02B 27/0172
  362/322
2005/0046952 A1* 3/2005 Nagata ............... G02B 27/0172
  359/627
2016/0085077 A1 3/2016 Milea et al.
2016/0116742 A1 4/2016 Wei
2016/0370591 A1 12/2016 Wilson et al.
2017/0017088 A1* 1/2017 Murray .............. G02B 27/0176
2017/0343816 A1 11/2017 Bietry et al.

OTHER PUBLICATIONS

Written Opinion of the ISA for PCT/KR2018/015750 dated Mar. 25, 2019, 6 pages.
Notification of the Reasons for Rejection dated May 24, 2022 in counterpart Korean Patent Application No. 10-2017-0175045 and English-language translation.
Notice of Final Rejection dated nOV. 21, 2022 in counterpart Korean Patent Application No. 10-2017-0175045 and English-language translation.

* cited by examiner

MOUNT DEVICE TO WHICH AN EXTERNAL ELECTRONIC DEVICE CAN BE COUPLED SO AS TO SLOPE

CROSS-REFERENCE TO RELATED APPLICATION(S)

This application is a National Phase Entry of PCT international Application No. PCT/KR2018/015750, which was filed on Dec. 12, 2018, and claims priority to Korean Patent Application No. 10-2017-0175045 filed on Dec. 19, 2017, in the Korean Intellectual Property Office, the contents of which are incorporated herein by reference.

BACKGROUND

1. Field

The disclosure relates a head-mounted device to and from which an external electronic device is attached and detached to slope.

2. Description of the Related Art

Various types of electronic devices have been developed and distributed thanks to the development of the electronic technologies. For example, portable electronic devices such as smartphones, notebooks, tablet PCs, and wearable devices have been increasingly distributed.

The electronic devices include electronic devices that are provided while being mounted on the bodies of users. The electronic devices are typically referred to as wearable devices. Examples of the wearable electronic devices may include head mounted display devices (e.g., head mounted displays), smart glasses, smart watches or wristbands, contact lens type devices, ring type devices, shoe type devices, clothing type devices, and groove type devices, and may have various forms in which the wearable electronic devices may be attached to and detached from portions of the bodies or clothes of users. The wearable electronic device may improve portability and accessibility for the user as it is directly mounted to the body.

As an example of a wearable electronic device, there is a head mounted device (referred to as a head mounted display (HMD) or which may be mounted on the head of a user and the like.

SUMMARY

The head-mounted device may be configured such that an external electronic device is attached to and detached from the head-mounted device. Because the head-mounted device has a structure that exposes an external electronic device to the outside, it is not appealing in the aspect of design, and when a separate cover is mounted on the head-mounted device to cover the external electronic device, the size of the product increases.

Accordingly, the disclosure provides a head-mounted device that prevents an external electronic device from being exposed to the outside by embedding the entire external electronic device in a housing such that the external electronic device slopes.

According to various embodiments, a mount device may include: a housing including a front surface, a rear surface facing the front surface and mounted on a head, and side surface surrounding the front surface and the rear surface; a coupling portion disposed in housing, and configured to be coupled so as to slope an external electronic device at a specific angle with respect to the side surface; a prism including a first surface facing at the specific angle with respect to at least a portion of a display included in the external electronic device, which is coupled to the coupling portion, a second surface configured to change the direction of light, which is input from the display through the first surface, and a third surface, from which the light, the direction of which has been changed, is output; a mirror disposed between the at least a portion of the side surface and the third surface; and a splitter disposed between the mirror and the third surface, and configured to transmit at least a portion of the light output through the third surface, and configured to change the direction of the reflected light to a direction toward the rear surface when the transmitted light is reflected through the mirror, the mount device comprising: the housing may dispose a head mounted part; the coupling portion may be disposed in the housing such that the external electronic device is coupled to the housing at an inclination within a specific range; the prism may be disposed in the housing and disposed such that the direction of light exiting from a display of the external electronic device is changed to a specific direction; the splitter may be disposed in the housing to slope and configured to transmit the light or change the direction of the light; and the mirror may be configured to reflect the light, which has passed through the splitter, and configured to deliver the reflected light to the splitter.

According to various embodiments, a mount device, to and from which an external electronic device is attached and detached may include: a housing disposing a head mounted part; a coupling portion disposed in the housing and configured to be coupled so as to slope the external electronic device; and a prism disposed in the housing and disposed such that the direction of light exiting from a display of the external electronic device is changed to a specific direction.

According to various embodiments, a mount device, to and from which an external electronic device is attached and detached may include: a housing including a front surface, which is mounted to a head, a rear surface facing the front surface, and side surface surrounding the front surface and the rear surface; a coupling portion disposed in housing, and configured to be coupled so as to slope an external electronic device at a specific angle with respect to the side surface; a prism disposed in the housing and configured to change the direction of light exiting from the display of the external electronic device; a splitter disposed in the housing to slope and configured to transmit the light and change the direction of the light; and a mirror configured to reflect the light, which has passed through the splitter, and deliver the reflected light to the splitter.

According to various embodiments of the disclosure, because the coupling portion for inserting and extracting the external electronic device such that the external electronic device slopes is provided in the housing, the external electronic device can be prevented from protruding to the front side of the housing, and accordingly, the design of the product can be made appealing and the product may be miniaturized by reducing the size of the product.

DETAILED DESCRIPTION

Figure 1:
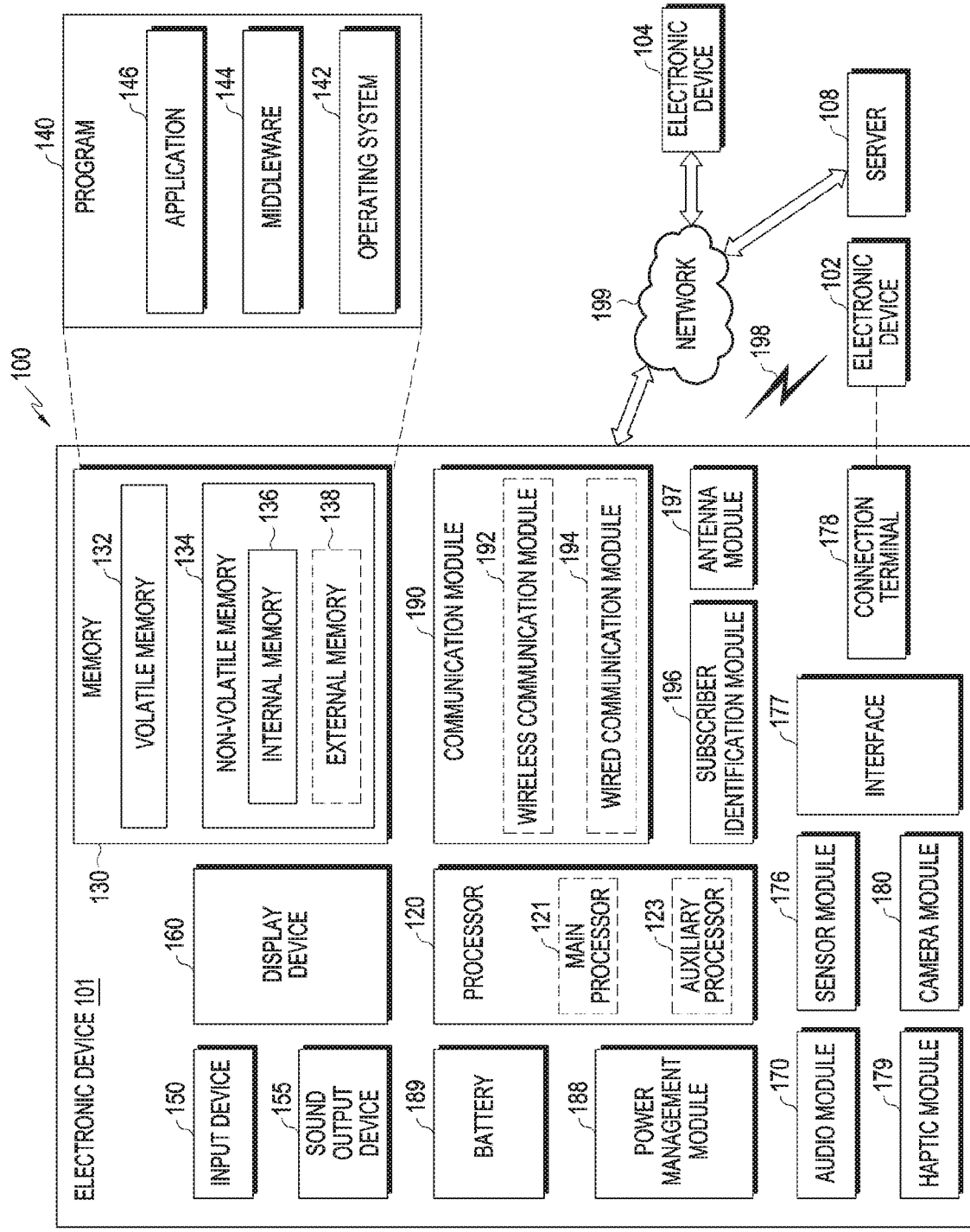
FIG. 1 is a block diagram illustrating a network environment including an electronic device, to which an external electronic device is attached and detached to slope according to various embodiments.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to one embodiment of the disclosure is not limited to the above described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

FIG. 1 is a block diagram of an electronic device 101 in a network environment 100 according to various embodiments. Referring to FIG. 1, in a network environment 100, an electronic device 101 may communicate an electronic device 102 through a first network 198 (e.g., a near field wireless communication), or may communicate with an electronic device 104 or a server 108 through a second network 199 (e.g., a long distance wireless communication). According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one (e.g., the display device 160 or the camera module 180) of the elements may be omitted from the electronic device 101 or other elements may be added. In some embodiments, for example, as in the sensor module 176 (e.g., a fingerprint sensor, an iris sensor, or an illumination sensor) embedded in the display device 160 (e.g., a display), some elements may be integrated to be implemented.

The processor 120, for example, may control at least one element (e.g., a hardware or software element) of the electronic device 101 connected to the processor 120 by driving software (e.g., a program 140), and may perform various data processing and calculations. The processor 120 may load commands or data received from another element (e.g., the sensor module 176 or the communication module 190) in a volatile memory 132 and process the commands or data, and may store result data in a nonvolatile memory 134. According to an embodiment, the processor 120 may include a main processor 121 (e.g., a central processing device or an application processor), and an auxiliary processor 123 (e.g., a graphic processing device, an image signal processor, a sensor hub processor, or a communication processor) which may be operated independently from the main processor 121, may use electric lower that is lower than that of the main processor 121 additionally or alternatively, or may be specified for a specific function. Here, the auxiliary processor 123 may be operated separately from the main processor 121 or while being embedded in the main processor 121.

The auxiliary processor 123, for example, may control at least some of functions or states related to at least one element (e.g., the display device 160, the sensor module 176, or the communication module 190) of the elements of the electronic device 101 in replacement of the main processor 121 while the main processor 121 is in an inactive (e.g., sleep) state, or together with the main processor 121 while the main processor 121 is in an active (e.g., application execution) state. According to an embodiment, the auxiliary processor 123 (e.g., an image signal processor or a communication processor) may be implemented as an element of another element (e.g., the camera module 180 or the communication module 190) which is functionally relevant. The memory 130 may store various data, for example, software (e.g., a program 140) and input data or output data for related commands used by at least one element (e.g., the processor 120 or the sensor module 176) of the electronic device 101. The memory 130 may include a volatile memory 132 or a nonvolatile memory 134.

The program 140, for example, may include an operating system 142, middleware 144, or an application 146 as the software stored in the memory 130.

The input device 150 is a device that may receive a command or data, which will be used in an element (e.g., the processor 120) of the electronic device 101 from the outside (e.g., the user) of the electronic device 101, and for example, may include a microphone, a mouse, or a keyboard.

The sound output device 155 is a device for outputting a sound signal to the outside of the electronic device 101, and for example, may include speaker used for a general purpose, such as reproduction of multimedia or reproduction of a recorded sound and a receiver used specifically for reception of a call. According to an embodiment, the receiver may be disposed integrally with or separately from the speaker.

The display device 160 is a device for visually providing information to the user of the electronic device 101, and for example, may include a display, a hologram device, or a projector, and a control circuit for controlling the corresponding device. According to an embodiment, the display device 160 may include a touch circuit or a pressure sensor for measuring the intensity of a pressure against a touch.

The audio module 170 may bilaterally convert a sound and an electrical signal. According to an embodiment, the audio module 170 may acquire a sound through the input device 150 or may output a sound through the sound output device 155 or an external electronic device (e.g., the electronic device 102) (e.g., a speaker or a headphone) by wire or wirelessly connected to the electronic device 101.

The sensor module 176 may generate an electrical signal or a data value corresponding to an operational state (e.g., electric power or a temperature) of the interior of the electronic device 101 or an environmental state of the outside. The sensor module 176, for example, may include a gesture sensor, a gyro sensor, an atmospheric pressure sensor, a magnetic sensor, an acceleration sensor, a proximity sensor, a color sensor, an infrared (IR) sensor, a biometric sensor, a temperature sensor, a humidity sensor, or an illumination sensor.

The interface 177 may support a specific protocol that may be connected to the external electronic device (e.g., the electronic device 102) by wire or wirelessly. According to an embodiment, the interface 177 may include a high definition multimedia interface (HDMI), a universal serial bus (USB) interface, an SD card interface, or an audio interface.

A connection terminal 178 may include a connector, for example, an HDMI connector, a USB connector, an SD card connector, or an audio connector (e.g., a headphone connector), which may physically connect the electronic device 101 and the external electronic device (e.g., the electronic device 102).

The haptic module 179 may convert an electric signal to a mechanical stimulus (e.g., vibration or a motion) or an electrical stimulus that may be recognized by a user through a haptic feeling or a sense of motion. The haptic module 179, for example, may include a motor, a piezoelectric element, or an electrical stimulus device.

The camera module 180 may capture a still image or a video. According to an embodiment, the camera module 180 may include one or more lenses, image sensors, image signal processors, or flashes.

The power management module 188 is a module for managing electric power supplied to the electronic device 101, and for example, may be constituted as at least a part of a power management integrated circuit (PMIC).

The battery 189 is a device for supplying electric power to at least one component of the electronic device 101, and for example, may include a primary battery that cannot be recharged, a secondary battery that may be recharged, or a fuel cell.

The communication module 190 may support establishment of a wired or wireless communication channel between the electronic device 101 and the external electronic device (e.g., the electronic device 102, the electronic device 104, or the server 108), and execution of communication through the established communication channel. The communication module 190 may include one or more communication processors that is operated independently from the processor 120 (e.g., an application processor) and supports wired communication or wireless communication. According to an embodiment, the communication module 190 may include a wireless communication module 192 (e.g., a cellular communication module, a short rage wireless communication module, or a global navigation satellite system (GNSS) communication module) or a wired communication module 194 (e.g., a local area network (LAN) communication module or a power line communication module), and may communicate with the external electronic device through a first network 198 (e.g., a short range communication network such as Bluetooth, Wi-Fi direct, or infrared data association (IrDA)) or a second network 199 (e.g., a long distance communication network such as a cellular network, the internet, or a computer network (e.g., LAN or WAN)) by using a communication module corresponding thereto. The various kinds of communication modules 190, which have been described above, may be implemented by one chip or may be implemented by separate chips, respectively.

According to an embodiment, the wireless communication module 192 may distinguish and authenticate the electronic device 101 in a communication network by using user information stored in the subscriber identification module 196.

The antenna module 197 may include one or more antennas for transmitting a signal or electric power to the outside or receiving a signal or electric power from the outside. According to an embodiment, the communication module 190 (e.g., the wireless communication module 192) may transmit a signal to an external electronic device or receive a signal from an external electronic device, through an antenna that is suitable for a communication scheme.

At least some elements of the elements may be connected to each other through a communication scheme (e.g., a bus, a general purpose input and output (GPIO), a serial peripheral interface (SPI), or a mobile industry processor interface (MIPI)) between peripheral devices, and may exchange signals (e.g., a command or data).

According to an embodiment, a command or data may be transmitted or received between the electronic device 101 and the external electronic device 104 through the server 108 connected to the second network 199. The electronic device 102 or 104 may be a device that is the same as or different from the electronic device 101. According to various embodiments of the disclosure, all or some of the operations executed by the electronic device 101 may be executed by another or a plurality of electronic devices or servers or a server. According to an embodiment of the disclosure, when the electronic device 101 should execute some functions or services automatically or upon request, it may request at least some functions associated with the functions or services from an external electronic device, in place of or in addition to directly executing the functions or services. The external electronic device, which has received the request, may execute a requested function or an additional function, and may deliver the result to the electronic device 101. The electronic device 101 may process the received result directly or additionally, and may provide a requested function or service. To achieve this, for example, the cloud computing, distributed computing, or client-server computing technologies may be used.

In various embodiments of the disclosure, the electronic device may be one or a combination of the aforementioned devices. For example, the electronic device may be a flexible device. It is apparent that the electronic device is not limited to the above-described devices.

The term "user" used in the description of the various embodiments may refer to a person who uses an electronic device or may refer to a device (e.g., an artificial electronic device) that uses an electronic device. Further, the term "wearer" used in the description of the various embodiments may refer to a person who wears the mount device on the head and uses contents provided by an external electronic device mounted on the mount device to be detachable.

Figure 2:
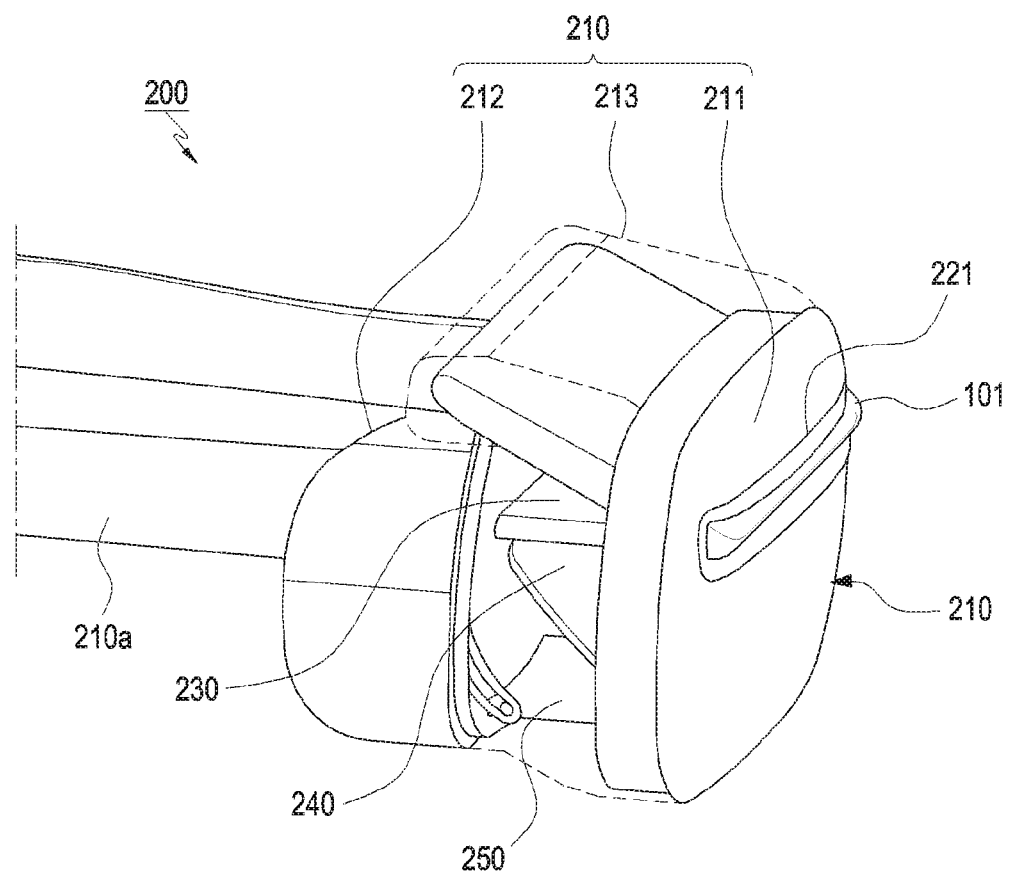
FIG. 2 is a perspective view illustrating a configuration of a mount device according to various embodiments.

FIG. 2 is a view illustrating a configuration of a mount device 200, to and from which an external electronic device (e.g., 101 of FIG. 1) may be attached and detached, according to various embodiments.

Referring to FIG. 2, the mount device 200 may include a head mounted part 210a to be fixed to the head of the user. The external electronic device (e.g., 101 of FIG. 1) including the display (e.g., 160 of FIG. 1) may be included in the mount device 200 to be attached to or detached from the mount device 200. The mount device 200 may provide at least one of a see-through or see-closed function for providing an augmented reality (AR), a virtual reality (VR), or a mixed reality (MR). The see-through function may generally mean a function of providing an actual external thing(s) or a virtual object to the user by using a visual or various sensitive means while delivering the actual external thing(s) to an eyeball (e.g., B1 of FIG. 6) through a display (e.g., 160 of FIG. 1) of an external electronic device (e.g., 101 of FIG. 1). According to the see-through mode, additional information and images for actually viewed things may be provided to the user. In another embodiment, additional information may be provided to the user by using a hologram without any display or lens. The see-closed function may be provided to the display (e.g., 160 of FIG. 1) of the external electronic device (e.g., 101 of FIG. 1). In an embodiment, the mount device 200 may be configured such that the two displays provided by the electronic device (e.g., 101 of FIG. 1) are disposed in front of the eyeballs (e.g., B1 of FIG. 6) of the user to allow the user to watch contents (a game, a movie, streaming, a broadcast, and the like) provided through the displays. Through this, the user may feel immersed by using an independent screen.

Figure 3:
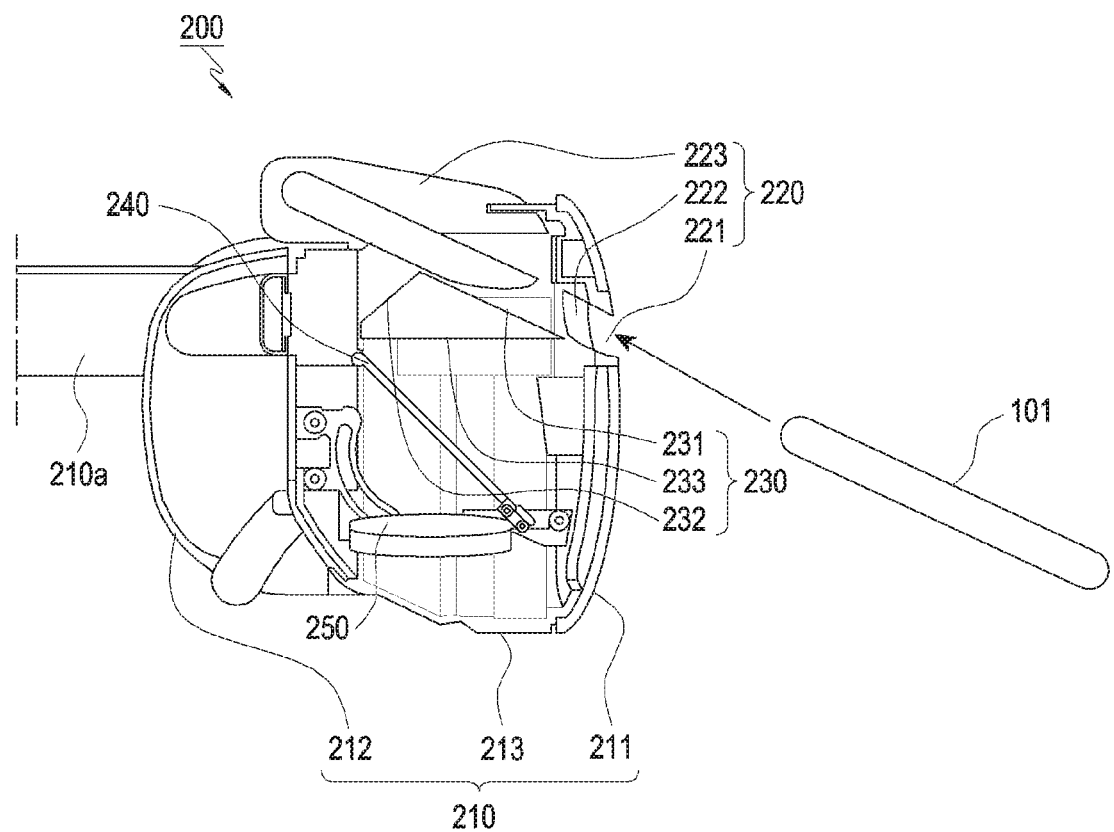
FIG. 3 is a side sectional view illustrating a state before an electronic device is coupled to a mount device according to various embodiments.
Figure 4:
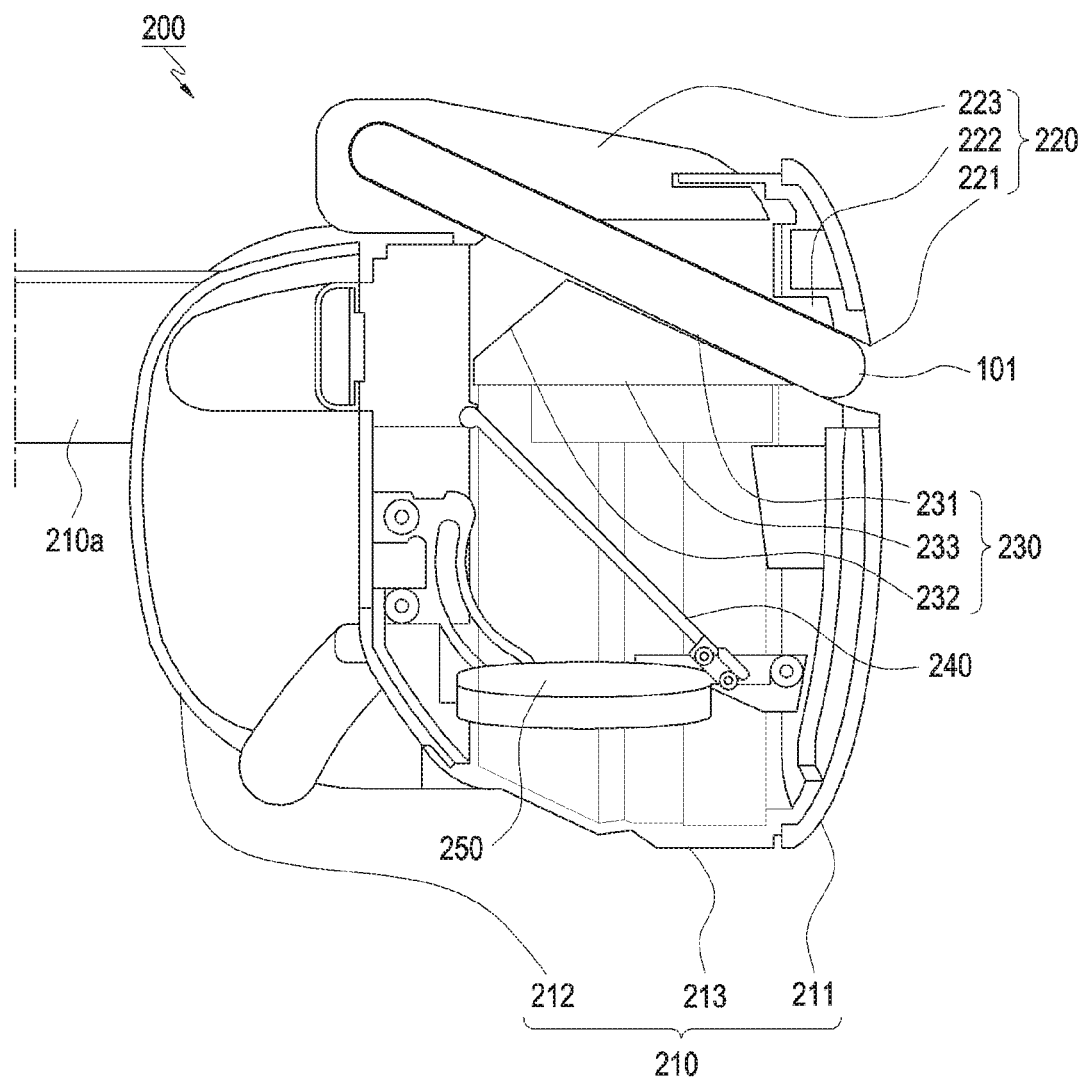
FIG. 4 is a side sectional view illustrating a state in which an electronic device is coupled to a mount device according to various embodiments.

FIG. 3 is a side sectional view illustrating a state before an electronic device (e.g., 101 of FIG. 1) is mounted on a mount device 200 according to various embodiments. FIG. 4 is a side sectional view illustrating a state in which an electronic device (e.g., 101 of FIG. 1) is mounted on a mount device 200 according to various embodiments.

Referring to FIGS. 3 and 4, the mount device 200 for providing an augmented reality (AR) may include a housing 210, a coupling portion 220, a prism 230, a splitter 240, and a mirror 250. For example, the housing 210 may include a front surface 211, a rear surface 212 that is opposite to the front surface 211 and is mounted on a head, and side surface 213 that surround the front surface 211 and the rear surface 212. A below-described coupling portion 220 may be disposed in the housing 210, and the coupling portion 220 may be configured to be coupled so as to slope the external electronic device (e.g., 101 of FIG. 1) at a specific range with respect to the side surface 213. For example, the external electronic device may be correspond to the distance between the front surface 211 and the rear surface 212. According to an embodiment, the mount device 200 may include a housing 210, the interior of the housing 210 may include the coupling portion 220, the prism 230, the splitter 240, and the mirror 250. A head mounted part 210a may be disposed outside the housing 210, and the head mounted part 210a may be mounted on the head of the user. The coupling portion 220 may be disposed in the housing 210 such that the external electronic apparatus (e.g., 101 of FIG. 1) may be coupled to the mount device 200 to slope. The prism 230 may be disposed in the housing 210 to change the direction of light A1 exiting from the display of the external electronic device (e.g., 101 of FIG. 1). For example, the prism 230 may include a first surface 231 that may face at least portion of the display included in the external electronic device (e.g., 101 of FIG. 1) that may be coupled to the coupling portion 220, to slope with respect to the at least portion of the display, a second surface 232 that may change the direction of light (e.g., A2 of FIG. 5) that is input from the display through the first surface 231, and a third surface 233 that may output light (e.g., A3 of FIG. 5), the direction of which has been changed. The splitter 240 may be disposed to slope in a specific range within the housing 210 such that the light (e.g., A3 of FIG. 5) may pass or the direction of the light may be changed. For example, the splitter 240 may be disposed between the mirror 250 and the third surface 233 of the prism 230, and may transmit at least a portion of the light (e.g., A3 of FIG. 5) exiting through the third surface 233 and change the direction of the light (e.g., A4 of FIG. 5) obtained by reflecting the transmitting light A3 through the mirror 250 to a direction toward the rear surface 212. The mirror 250 may be disposed between at least a portion of the side surface 213 of the housing 210 and the third surface 233 of the prism 230 such that the light (e.g., A4 of FIG. 5), which has passed through the splitter 240, is reflected and is delivered to the splitter 240.

According to an embodiment, the splitter 240 may transmit at least portion of the light (e.g., A3 of FIG. 5) delivered from the third surface 233 of the prism 230 and output the at least portion of the light to the mirror 250. The mirror 250 may reflect the exiting light (e.g., A4 of FIG. 5) and input the reflected light to the splitter 240 again, and the splitter 240 may change the direction of the input light (e.g., A5 of FIG. 5) and deliver the light to the eyeballs (e.g., B1 of FIG. 6) of the user.

In this way, because the coupling portion 220 that prevents the entire external electronic device (e.g., 101 of FIG. 1) from being exposed to the outside of the housing 210 by coupling the external electronic device (e.g., 101 of FIG. 1) such that the external electronic device slopes in a specific range and embedding the entire external electronic device is provided in the housing 210, the external electronic device (e.g., 101 of FIG. 1) can be prevented from being exposed to the outside of the housing 210, the design of the mount device 200 can be made appealing, and the size of the product can be reduced and miniaturized.

Referring to FIGS. 3 and 4, the coupling portion 220 may form an opening 221, a sloping portion 222, and a holder portion 223. The opening 221 may be disposed outside the housing 210 such that the external electronic device may be coupled to the housing 210 to slope. The sloping portion 222 may be disposed in the opening 221 such that the external electronic device (e.g., 101 of FIG. 1) may slope when being inserted into the opening 221. The holder part 223 may be disposed in the sloping portion 222 such that the external electronic apparatus (e.g., 101 of FIG. 1) coupled to the mount device 200 to slope may be fixed.

The external electronic device (e.g., 101 of FIG. 1) may be coupled to the opening 221 of the housing 210. The external electronic device (e.g., 101 of FIG. 1) may be coupled to slope by the sloping portion 222 disposed in the opening 221 when being inserted into the opening 221. Then, the external electronic device (e.g., 101 of FIG. 1) may be inserted into the holder portion 223 to be fixed so as to slope when being coupled to slope along the sloping portion 222.

An elastic member may be included in at least a partial area of the sloping portion 222 to fix or separate the external electronic device (e.g., 101 of FIG. 1). It is exemplified in the present embodiment that the sloping portion 222 is an elastic member, but the disclosure is not limited thereto. That is, any configuration that fixes or separates the external electronic device (e.g., 101 of FIG. 1) may be variously applied as the sloping portion 222. For example, the sloping portion 222 may include rubber or silicon.

According to an embodiment, the holder portion 223 may include a magnet such that the external electronic device (e.g., 101 of FIG. 1) may be fixed or separated by a magnetic force. Any configuration that may fix the external electronic device (e.g., 101 of FIG. 1) by inserting the external electronic device or may separate the external electronic device (e.g., 101 of FIG. 1) by pulling the external electronic device may be variously applied as the holder portion 223. For example, the holder portion 223 may include a leaf spring that holds the external electronic device (e.g., 101 of FIG. 1) by using an elastic force.

In this way, the coupling portion 220 is configured such that the entire external electronic device (e.g., 101 of FIG. 1) may be coupled to the housing 210 to slope. The inclination angle of the coupling portion 220 may substantially include 10 degrees to 45 degrees.

Accordingly, the external electronic device (e.g., 101 of FIG. 1) coupled to the housing 210 may be disposed at 10 degrees to 45 degrees due to the inclination angle of the coupling portion 220. In the embodiment, the coupling portion may be disposed while the inclination angle of the coupling portion is limited to 20 degrees.

Figure 5:
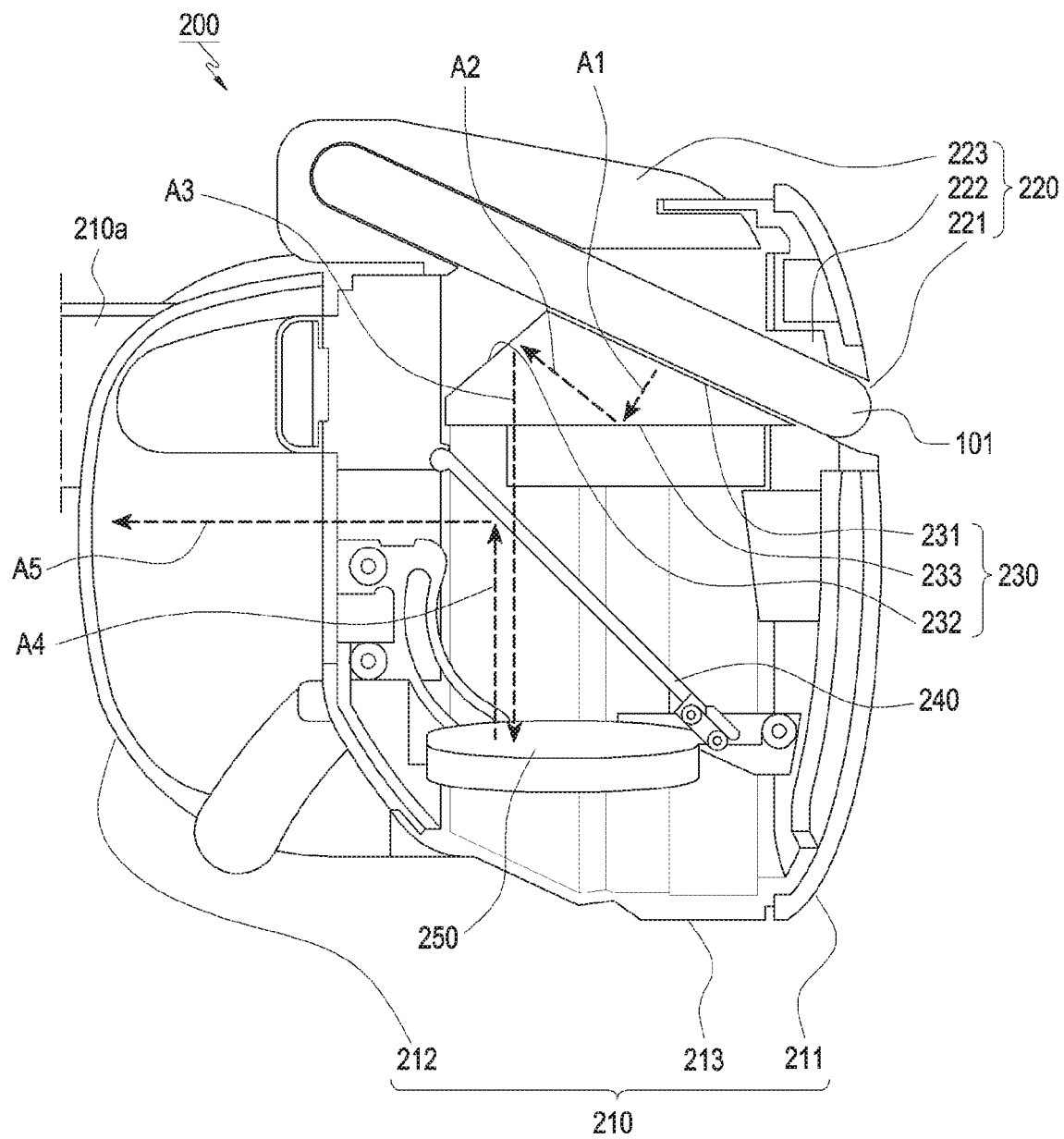
FIG. 5 is a side sectional view illustrating a use state of a mount device according to various embodiments.
Figure 6:
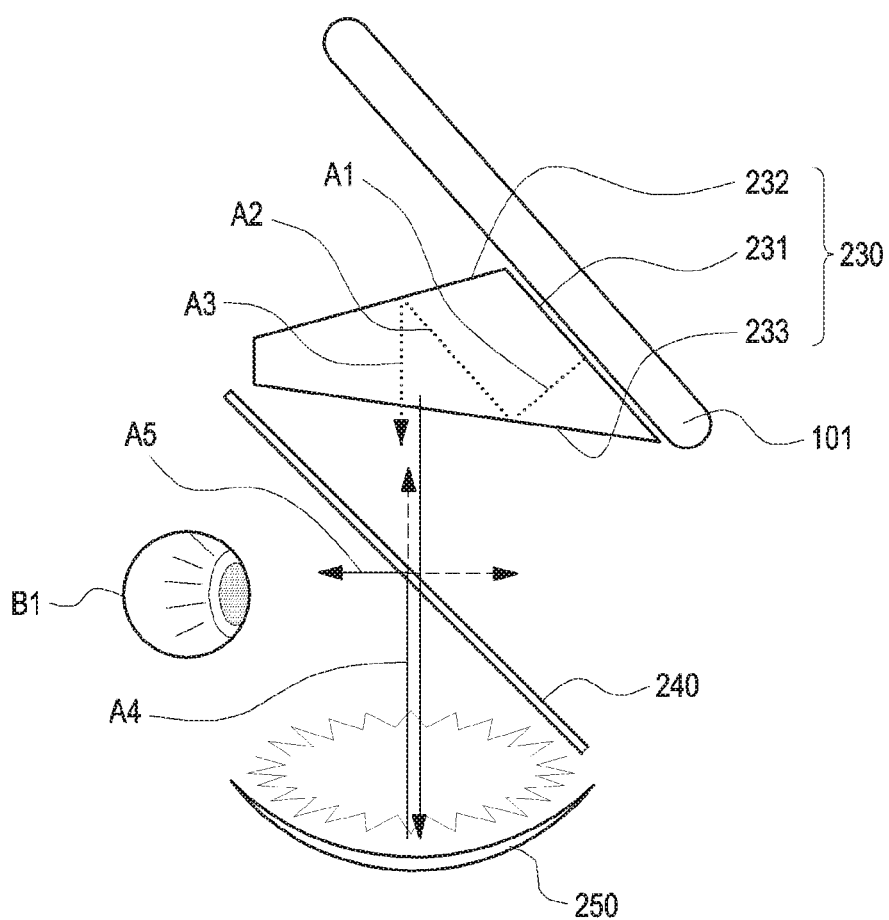
FIG. 6 is a side sectional view illustrating an operational state of a prism of a mount device according to various embodiments.

FIG. 5 is a side sectional view illustrating a use state of a prism 230 of a configuration of a mount device 200 according to various embodiments. FIG. 6 is a side sectional view illustrating an operational state of a prism 230 of a configuration of a mount device 200 according to various embodiments.

Referring to FIGS. 5 and 6, the prism 230 may include first, second, and third surfaces 232, 232, and 233. For example, the first surface 231 faces a display of the external electronic device (e.g., 101 of FIG. 1), and may input light A1 exiting from the display (e.g., 160 of FIG. 1). Light A2, the direction of which has been changed by the first surface 231, may be output to the third surface 233 by the second surface 232. The exiting light A3 may be delivered to the splitter 240 by the third surface 233.

In this way, the external electronic device (e.g., 101 of FIG. 1) may be coupled to the interior of the housing 210 through the opening 221 and the external electronic device (e.g., 101 of FIG. 1) may be fixed to slope by the sloping portion 222 and the holder portion 223. Then, the display (e.g., 160 of FIG. 1) of the external electronic device (e.g., 101 of FIG. 1) and the first surface 231 may face each other, and the light A1 emitted from the display may be input to the first surface 231. The light A1 input through the first surface 231 may change the direction of the light A2 through the second surface 232. The direction of the light A3, the direction of which has been changed through the second surface 232, may be changed when being output to the third surface 233 and exit to the outside of the prism 230, and the light A3 exiting from the prism 230 may be delivered to the splitter 240. Only at least a portion of the light A3 may pass through the splitter 240. For example, only half the light A3 may pass through the splitter 240. The light A3, which has passed through the splitter 240, may be delivered to the mirror 250 provided under the splitter 240. The mirror 250 may reflect the light A1, and the reflected light A4 may be delivered to the splitter 240 again. The splitter 240 may change the direction of the light A4 reflected by the mirror 250, and the light A5, the direction of which has been changed, may be delivered to the eyeball B1 of the user located on the rear surface 212 of the housing 210. The eyeball B1 of the user may view various contents provided through the display (e.g., 160 of FIG. 1). The various contents may be one of the contents related to the see-through function provided by an augmented reality or the see-closed function provided by a virtual reality (VR).

According to an embodiment, the mirror 250 may include a concave mirror 250. In the present embodiment, a concave mirror 250 is exemplified as the mirror 250 but the disclosure is not limited thereto. That is, any configuration that may reflect light may be variously applied as the mirror 250. For example, the mirror 250 may include a planar mirror 250.

As illustrated in FIG. 6, which has been described above, the external electronic device (e.g., 101 of FIG. 1) may be coupled to the opening 221 of the housing 210 and may be located to slope at the same time. The external electronic device (e.g., 101 of FIG. 1) may face the first surface 231 of the prism 230. The first surface 231 may output the light A1 exiting from the display of the external electronic device (e.g., 101 of FIG. 1), and may deliver the light to the second surface 232 of the prism 230. The second surface 232 may output the light A2 after changing the direction of the light A1, and may deliver the light A2, the direction of which has been changed by the third surface 233. The third surface 233 may change the direction of the light A2, and may deliver the light A3, the direction of which has been changed, to the splitter 240. Only at least a portion A3 of the light delivered from the third surface 233 of the prism 230 may pass through the splitter 240 and may be delivered to the mirror 250. The mirror 250 may reflect the light A3, and the reflected light A4 may be delivered to the splitter 240 again. The splitter 240 may change the direction of the light A4 reflected by the mirror 250, and the light A5, the direction of which has been changed, may be delivered to the eyeball B1 of the user located on the rear surface 212 of the housing 210.

In this way, because the prism 230 that changes the direction of the light sloping in the housing 210 to a linear direction, a sloping direction, and a horizontal direction is provided, the prism 230 may change the direction of the sloping light to a linear direction and may deliver the light to the splitter 240, and the splitter 240 may deliver the linear light to the eyeball B1 of the user. Accordingly, the prism 230 may change the direction of the sloping light to a linear direction, and may facilitate the travel of the light along a path.

According to an embodiment, the external electronic device (e.g., 101 of FIG. 1) may be mounted on the mount device 200 to slope, and the external electronic device (e.g., 101 of FIG. 1) may execute a see-through mode that provides an augmented reality (AR). For example, if the external electronic device (e.g., 101 of FIG. 1) executes a see-though mode based on an augmented reality (AR), a camera module (e.g., 180 of FIG. 1) provided in the external electronic device (e.g., 101 of FIG. 1) may collect image information through photographing and realize an augmented reality (AR) through the collected image information.

For example, the augmented reality (AR) means a technology of augmenting the reality of an image captured by an actual camera by applying virtual information or graphics to the image. The virtual information, for example, may be an image in the form of a text or a graphic on a micro display, and the image captured by an actual camera may be information on an actual object observed in the field of view of a device. Methods for realizing an augmented reality (AR) may be largely classified into two methods. One of them is a method of outputting a captured image by using a camera module and outputting information on a subject, such as an object or a person recognized in the image together with the captured image. The other method is a method used in a head mounted display, such as Google glasses (a brand name) or a head up display device, and is a method of simply outputting only information on a subject included in a captured image without directly using the captured image.

In this way, the mount device 200 may be configured such that two displays provided by the external electronic device (e.g., 101 of FIG. 1) may be disposed in front of the eyeballs B1 of the user, and may be configured such that the user may view various contents manufactured through the methods of realizing augmented reality (AR) through the displays.

According to an embodiment, when the user does not use the mount device 200, first, the mount device 200 may be separated from the head of the user, and the external electronic device (e.g., 101 of FIG. 1) coupled to the housing 210 to slope may be separated from the coupling portion 220. For example, the user may separate the coupling portion 200 by gripping and pulling at least a portion of the external electronic device (e.g., 101 of FIG. 1).

Figure 7:
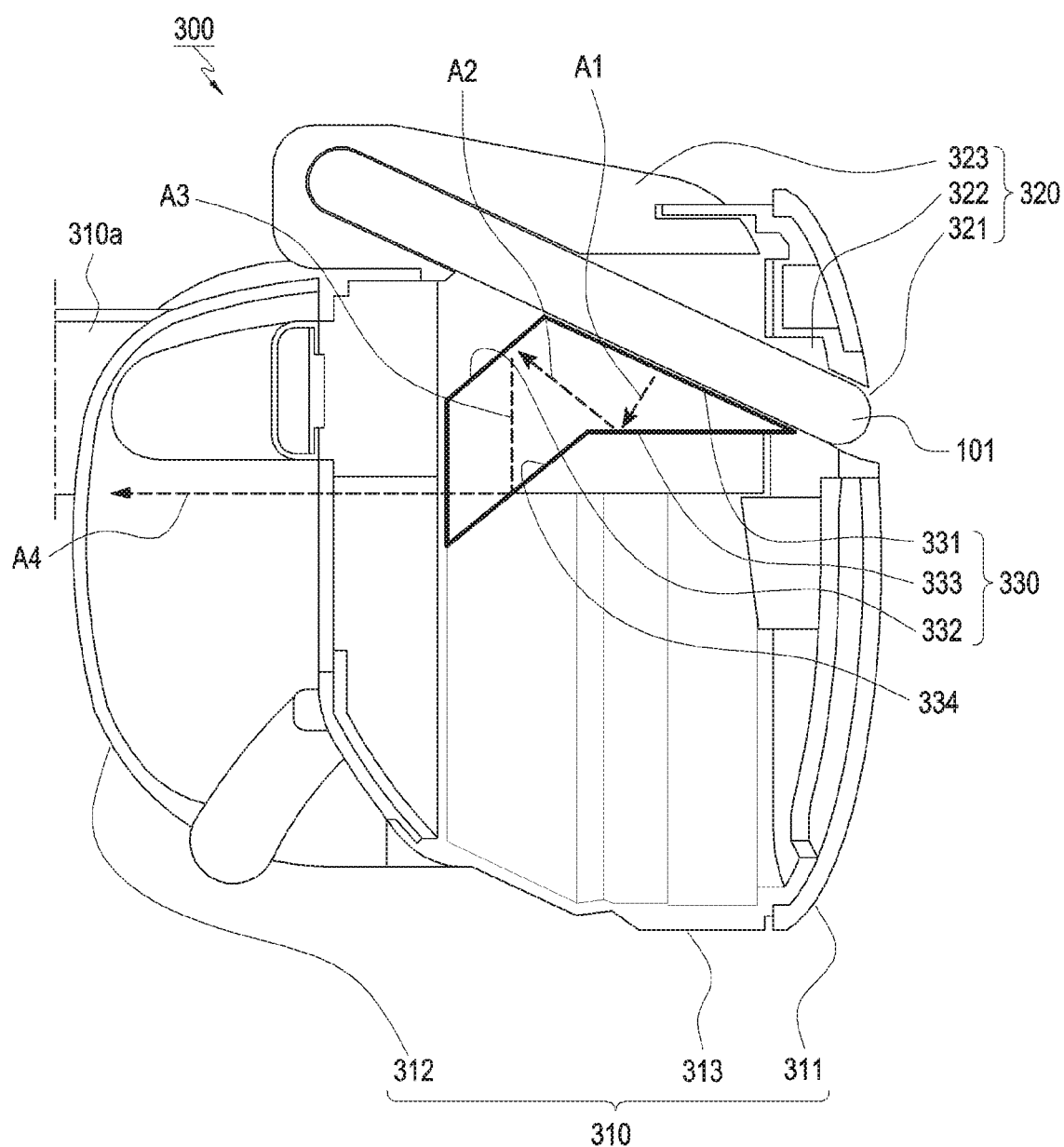
FIG. 7 is a perspective view illustrating a configuration of a mount device according to other various embodiments.

FIG. 7 is a side sectional view illustrating a configuration of a mount device 300, to and from which an external electronic device (e.g., 101 of FIG. 1) may be attached and detached, according to other various embodiments.

Referring to FIG. 7, the mount device 300 may include a housing 310, a coupling portion 320, and a prism 330. For example, the housing 310 may include a front surface 311, a rear surface 312 that is opposite to the front surface 311 and is mounted on a head, and side surface 313 that surround the front surface 312 and the rear surface 311 A coupling portion 320 may be disposed in the housing 310, and the coupling portion 320 may be configured to be coupled so as to slope the external electronic device (e.g., 101 of FIG. 1) at a specific range with respect to the side surface 313. For example, the external electronic device may be correspond to the distance between the front surface 311 and the rear surface 312. According to an embodiment, the mount device 300 may include a housing 310, the interior of the housing 210 may include the coupling portion 320 and the prism 330. A head mounted part 310a may be disposed outside the housing 310, and the head mounted part 310a may be mounted on the head of the user. The coupling portion 320 may be disposed in the housing 310 such that the external electronic apparatus (e.g., 101 of FIG. 1) may be coupled to the mount device 300 to slope. The prism 330 may be disposed in the housing 310 to change the direction of light exiting from the display of the external electronic device (e.g., 101 of FIG. 1). the coupling portion 320 may form an opening 321, an sloping portion 322, and a holder portion 323. The opening 321 may be disposed outside the housing 310 such that the external electronic device may be coupled to the housing 310 to slope. The sloping portion 322 may be disposed in the opening 321 such that the external electronic device (e.g., 101 of FIG. 1) may slope when being inserted into the opening 321. The holder part 323 may be disposed in the sloping portion 322 such that the external electronic apparatus (e.g., 101 of FIG. 1) coupled to the mount device 300 to slope may be fixed.

The prism 330 may include first, second, third, and fourth surfaces 331, 332, 333, and 334 to change the direction of the light. For example, the first surface 331 may face at least a portion of the display included in the external electronic device (e.g., 101 of FIG. 1) to slope with respect to the at least a portion of the display, and the light A1 of the display may be introduced to slope. The second surface 332 may change the direction of the light A3 input through the first surface 331. The third surface 333 may change the direction of the light A3 such that the light A3 may be sent to the fourth surface 334. The fourth surface 334 may change the light A3, the direction of which has been changed, and may deliver the changed light A4 to the eyeball (e.g., B1 of FIG. 6) of the user.

According to an embodiment, the first surface 331 of the prism 330 may allow the introduction of the light A1 into the display, and the introduced light A1 may be reflected by the second surface 332 and be delivered to the third surface 333. The third surface 333 may reflect the delivered light A2 again to change the direction of the light A3. The fourth surface 334 may reflect the changed light A3 again to change the direction of the light A4 and deliver the light A4 to the eyeball of the user.

In this way, because the prism 330 including the first, second, third, and fourth surfaces 331, 332, 333, and 334 that change the direction of light is provided in the housing 310, the first, second, third, and fourth surfaces 331, 332, 333, and 334 of the prism 330 may change the direction of the light of the display and deliver the changed light to the eyeball of the user, and accordingly, the manufacturing costs of the product can be saved and the product can be miniaturized and slimmed as the splitter or the mirror that is necessary for changing the direction of light is unnecessary.

According to various embodiments, a mount device may include: a housing including a front surface, a rear surface facing the front surface and mounted on a head, and side surface surrounding the front surface and the rear surface; a coupling portion disposed in housing, and configured to be coupled so as to slope an external electronic device at a specific angle with respect to the side surface; a prism including a first surface facing at the specific angle with respect to at least a portion of a display included in the external electronic device, which is coupled to the coupling portion, a second surface configured to change the direction of light, which is input from the display through the first surface, and a third surface, from which the light, the direction of which has been changed, is output; a mirror disposed between the at least a portion of the side surface and the third surface; and a splitter disposed between the mirror and the third surface, and configured to transmit at least a portion of the light output through the third surface, and configured to change the direction of the reflected light to a direction toward the rear surface when the transmitted light is reflected through the mirror, wherein the mount device comprising: the housing may dispose a head mounted part; the coupling portion may be disposed in the housing such that the external electronic device is coupled to the housing at an inclination within a specific range; the prism may be disposed in the housing and disposed such that the direction of light exiting from a display of the external electronic device is changed to a specific direction; the splitter may be disposed in the housing to slope and configured to transmit the light or change the direction of the light; and the mirror may be configured to reflect the light, which has passed through the splitter, and configured to deliver the reflected light to the splitter.

According to various embodiments, the coupling portion may be configured to embed the entire external electronic device.

According to various embodiments, a mount device, to and from which an external electronic device is attached and detached may include: a housing disposing a head mounted part; a coupling portion disposed in the housing and may be configured to be coupled so as to slope the external electronic device; and a prism disposed in the housing and disposed such that the direction of light exiting from a display of the external electronic device is changed to a specific direction.

According to various embodiments, the coupling portion may be configured to prevent at least a portion of the external electronic device from protruding to the outside of the housing.

According to various embodiments, the prism may include a first surface, a second surface, a third surface, and a fourth surface, and the first surface may face the display of the external electronic device and the light exiting from the display may be input in the prism, the second surface may change the direction of the light input from the first surface, and the third surface may deliver the light, the direction of which has been changed, fourth surface, and the fourth surface changes the direction of the delivered light and which is output to outside of the prism the light, the direction of which has been changed.

According to various embodiments, a mount device, to and from which an external electronic device is attached and detached may include: a housing including a front surface, which is mounted to a head, a rear surface facing the front surface, and side surface surrounding the front surface and the rear surface; a coupling portion disposed in housing, and configured to be coupled so as to slope an external electronic device at a specific angle with respect to the side surface; a prism disposed in the housing and configured to change the direction of light exiting from the display of the external electronic device; a splitter disposed in the housing to slope and configured to transmit the light and change the direction of the light; and a mirror configured to reflect the light, which has passed through the splitter, and deliver the reflected light to the splitter.

According to various embodiments, the coupling portion may be configured to embed the entire external electronic device.

According to various embodiments, the coupling portion may include: an opening formed in the housing; an sloping portion disposed in the opening, and configured to be coupled so as to slope the external electronic device through the opening; and a holder portion disposed in the sloping portion and configured to fix the external electronic device coupled to slope.

According to various embodiments, an elastic member may be disposed to at least a partial area of the sloping portion, and may be configured to fix or separate the external electronic device.

According to various embodiments, the holder portion may be configured to fix or separate the external electronic device by using a magnetic field.

According to various embodiments, the prism may include a first surface, a second surface, and a third surface, and the first surface may face the display of the external electronic device and the light exiting from the display may be in to the prism, the second surface may change the direction of the light from to the first surface, and the third surface may deliver the light, the direction of which has been changed, to the splitter.

According to various embodiments, the splitter may be configured to pass at least a portion of the light delivered from the third surface of the prism, and may be configured to deliver the at least a portion of the transmitted light to the mirror, and may be configured to change the direction of the light, which has been reflected by the mirror, again and may be configured to deliver the changed light to an eyeball of a user.

According to various embodiments, the mirror may include a concave mirror.

According to various embodiments, the inclination angle of the coupling portion may substantially range from 10 degrees to 45 degrees.

It is noted by those skilled in the art to which the disclosure pertains that the mount device according to various embodiments of the disclosure, which have been described above, are not limited by the above-mentioned embodiments and the drawings, but may be variously replaced, modified, and changed without departing from the scope of the disclosure.

What is claimed is:

1. A mount device comprising:
a housing comprising a front surface, a rear surface facing the front surface and mounted on a head, and side surface surrounding the front surface and the rear surface;
a coupling portion disposed in housing, and configured to be coupled so as to slope an external electronic device at a specific angle with respect to the side surface,
a prism comprising a first surface facing at the specific angle with respect to at least a portion of a display included in the external electronic device, which is coupled to the coupling portion, a second surface configured to change a direction of light, which is input from the display through the first surface, and a third surface, from which the light, the direction of which has been changed, is output;
a mirror disposed between the at least a portion of the side surface and the third surface; and
a splitter disposed between the mirror and the third surface, and configured to transmit at least a portion of light output through the third surface, and configured to change a direction of reflected light to a direction toward the rear surface when the transmitted light is reflected through the mirror,
wherein the coupling portion comprises:
an opening formed in the housing;
a sloping portion disposed in the opening, and configured to be coupled so as to slope the external electronic device through the opening; and
a holder portion disposed in the sloping portion, and configured to fix the external electronic device coupled to slope, and
wherein the coupling portion is configured to embed the entire external electronic device.

2. The mount device of claim 1, wherein the mount device comprises:
the housing disposing a head mounted part;
the coupling portion disposed in the housing such that the external electronic device is coupled to the housing at an inclination within a specific range,
the prism disposed in the housing and disposed such that the direction of light exiting from a display of the external electronic device is changed to a specific direction;
the splitter disposed in the housing to slope and configured to transmit light or change a direction of light; and
the mirror configured to reflect the light, which has passed through the splitter, and configured to deliver the reflected light to the splitter.

3. A mount device, to and from which an external electronic device is attached and detached, the mount device comprising:
a housing disposing a head mounted part;
a coupling portion disposed in the housing, and configured to be coupled so as to slope the external electronic device; and
a prism disposed in the housing and disposed such that a direction of light exiting from a display of the external electronic device is changed to a specific direction,
wherein the coupling portion comprises:
an opening formed in the housing;
a sloping portion disposed in the opening, and configured to be coupled so as to slope the external electronic device through the opening; and
a holder portion disposed in the sloping portion, and configured to fix the external electronic device coupled to slope, and
wherein the coupling portion is configured to embed the entire external electronic device.

4. The mount device of claim 3, wherein the coupling portion is configured to prevent at least a portion of the external electronic device from protruding to the outside of the housing.

5. The mount device of claim 3, wherein the prism comprises a first surface, a second surface, a third surface and a fourth surface, and
wherein the first surface faces the display of the external electronic device and the light exiting from the display is input in the prism, the second surface changes the direction of light input from the first surface, and the third surface delivers light, the direction of which has been changed, to the fourth surface, and the fourth surface changes a direction of the delivered light and outputs to outside of the prism the light, the direction of which has been changed.

6. A mount device, to and from which an external electronic device is attached and detached, the mount device comprising:
a housing comprising a front surface, which is mounted to a head, a rear surface facing the front surface, and side surface surrounding the front surface and the rear surface;
a coupling portion disposed in housing, and configured to be coupled so as to slope an external electronic device at a specific angle with respect to the side surface;
a prism disposed in the housing and configured to change a direction of light exiting from a display of the external electronic device;
a splitter disposed in the housing to slope and configured to transmit light and change direction of the light; and
a mirror configured to reflect light, which has passed through the splitter, and deliver the reflected light to the splitter,
wherein the coupling portion comprises:
an opening formed in the housing;
a sloping portion disposed in the opening, and configured to be coupled so as to slope the external electronic device through the opening; and
a holder portion disposed in the sloping portion, and configured to fix the external electronic device coupled to slope, and
wherein the coupling portion is configured to embed the entire external electronic device.

7. The mount device of claim 6, wherein an elastic member is disposed in at least a partial area of the sloping portion, and is configured to fix or separate the external electronic device.

8. The mount device of claim 6, wherein the holder portion is configured to fix or separate the external electronic device using a magnetic field.

9. The mount device of claim 6, wherein the prism comprises a first surface, a second surface, and a third surface,
wherein the first surface faces the display of the external electronic device and the light exiting from the display is input in the prism, the second surface changes direction of light input from the first surface, and the third surface delivers the light, the direction of which has been changed, to the splitter.

10. The mount device of claim 9, wherein the splitter is configured to pass at least a portion of the light delivered from the third surface of the prism and is configured to deliver the at least a portion of the transmitted light to the mirror, and is configured to change a direction of the light, which has been reflected by the mirror, and is configured to deliver the changed light to an eyeball of a user.

11. The mount device of claim 6, wherein the mirror comprises a concave mirror.

12. The mount device of claim 6, wherein the inclination angle of the coupling portion substantially comprises a range of 10 degrees to 45 degrees.

* * * * *